Dec. 9, 1969   J. A. WISEMAN   3,482,674
CONVEYOR SYSTEM FOR HANDLING GROUPS OF ARTICLES
Filed March 11, 1968  2 Sheets-Sheet 1
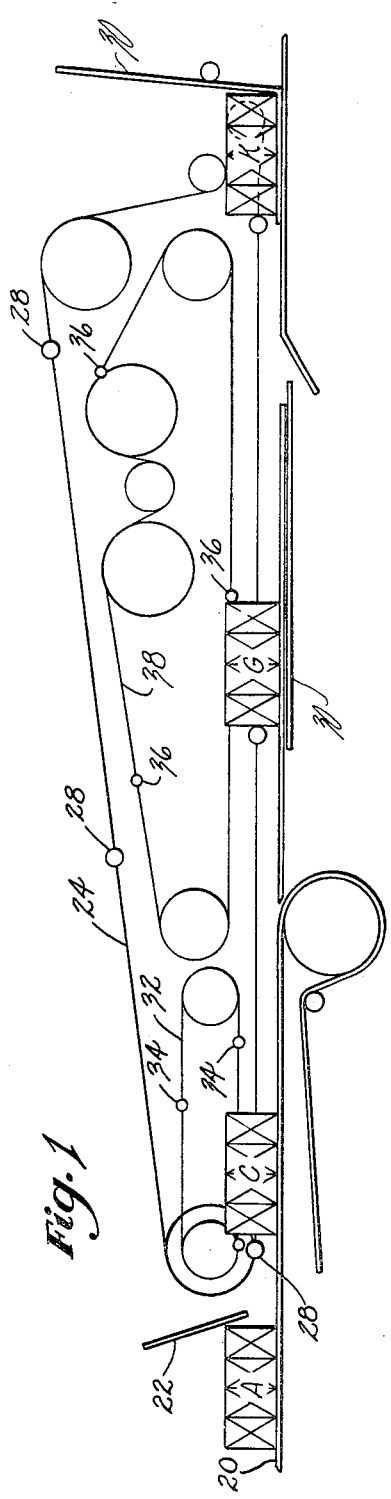
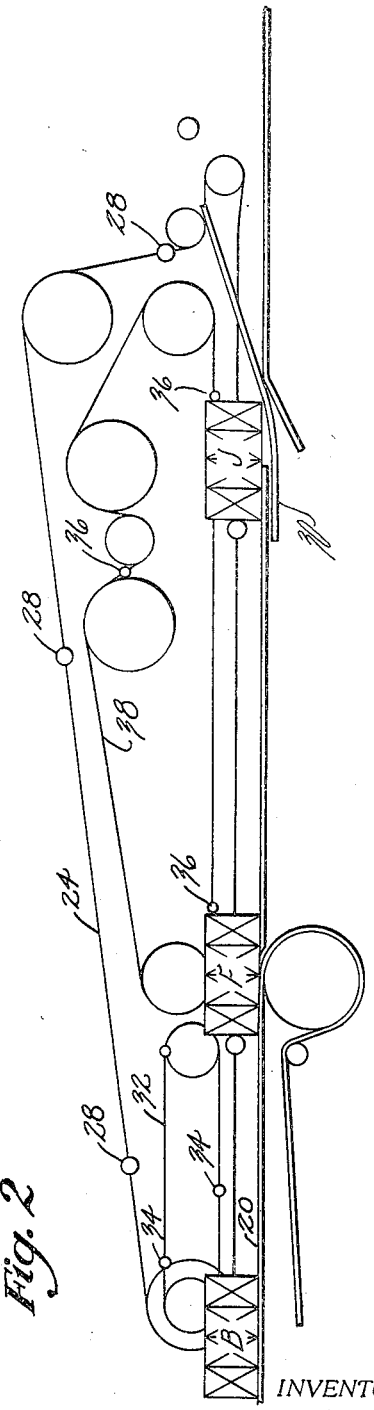
INVENTOR.
John A. Wiseman
BY
McCormick, Paulding & Huber
ATTORNEYS

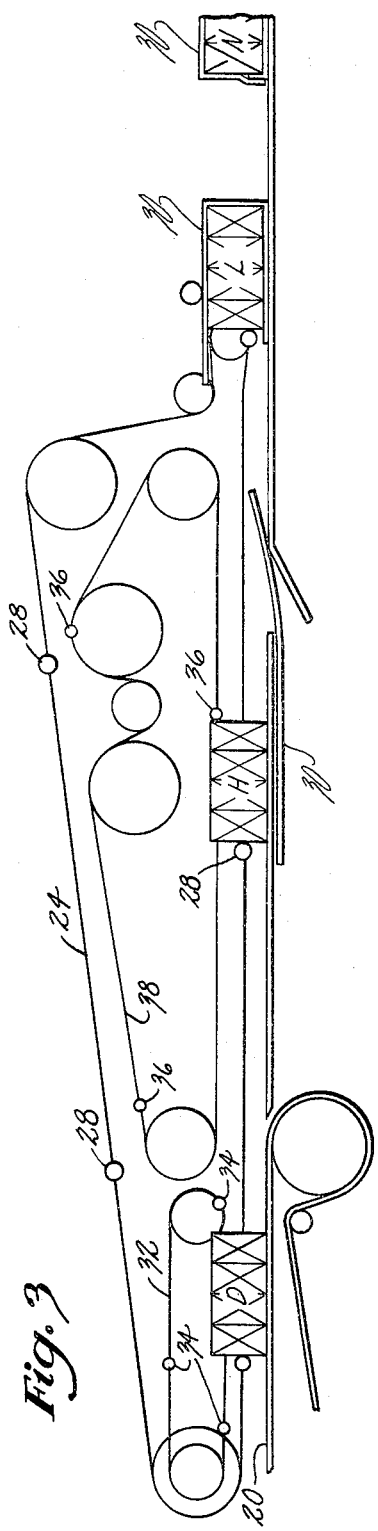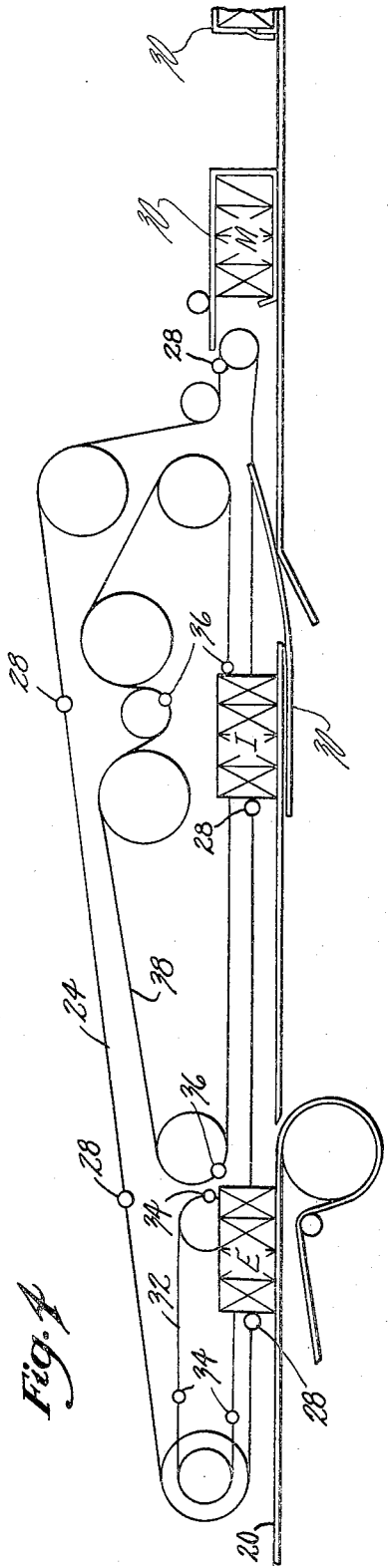

United States Patent Office 3,482,674
Patented Dec. 9, 1969

3,482,674
CONVEYOR SYSTEM FOR HANDLING GROUPS OF ARTICLES
John A. Wiseman, Glastonbury, Conn., assignor to Emhart Corporation, Bloomfield, Conn., a corporation of Connecticut
Filed Mar. 11, 1968, Ser. No. 712,143
Int. Cl. B65g 47/26
U.S. Cl. 198—34          5 Claims

ABSTRACT OF THE DISCLOSURE

An infeed conveyor belt brings groups of articles, successively, to a position wherein a main flight bar and a retainer flight bar associated with respective flight bar conveyors, can both move behind each such group. The main flight bar accelerates the group to a speed of 2½ times that of the infeed conveyor, and the retainer flight bar moves at approximately infeed conveyor belt speed to retain the succeeding group in position for acceleration by another main flight bar. The most recently accelerated group is not only engaged from behind by the main flight bar, but is also restrained at its forward end by a third flight bar associated with a third flight bar conveyor, which third flight bar cooperates with an associated main flight bar to feed successive article groups in accurately indexed relationship across a deadplate downstream of the conveyor belt.

Summary of invention

This invention relates to conveyor systems for handling grouped articles, and deals more particularly with a flight bar conveyor system capable of advancing slugs or groups of articles across a stationary platform or deadplate in accurately indexed relationship with respect to one another.

A primary object of the present invention is to provide a flight bar conveyor system of the foregoing character wherein these slugs or groups are restrained as they are so advanced across the deadplate so that carton blanks can be conveniently mated therewith and folded therearound as described in U.S. patient application Ser. No. 676,999, filed Oct. 12, 1967 entitled "Packing Machine Wherein Flat Blanks Are Folded Around Article Groups Fed Continuously Therethrough," and assigned to the assignee herein.

The drawings shows a preferred embodiment of the invention and such embodiment will be described, but it will be understood that various changes may be made from the construction disclosed, and that the drawings and description are not to be construed as defining or limiting the scope of the invention.

Brief description of drawings

FIGS. 1 through 4 show, in schematic fashion, a flight bar conveyor system constructed in accordance with the present invention, with a plurality of grouped articles or slugs being fed continuously across a fixed platform or deadplate of the type described in the above-mentioned patent application. The various successive positions of a slug are indicated consecutively by the letters A through N inclusively.

Detailed description

Turning now to the drawings in greater detail, a conventional infeed conveyor 20 is provided for feeding articles such as cans horizontally toward the right in each of the various figures. The conveyor 20 preferably comprises a continuously driven belt which operates at a speed which need not be closely controlled, but which is preferably within well established limits for belt type conveyors generally. A grouper for the articles is indicated schematically at 22, being mounted above the path of movement of the articles in order to assure that some separation is provided between predetermined numbers of said articles. The grouper 22 may be of conventional construction and does not form an essential part of the invention to be described herein.

In accordance with the present invention, a main flight bar conveyor 24 is arranged at least partially above a downstream portion of the infeed conveyor 20, and in part over a horizontally disposed deadplate 26. The main flight bar conveyor 24 is preferably similar to the flight bar conveyor described in the above-mentioned patent application, and has a plurality of flight bars 28, 28 for accelerating the slugs on the infeed conveyor 20 and carrying the same across the deadplate 26. As described in the above-mentioned patent application, means is provided for successively feeding carton blanks 30, 30 to a position beneath the deadplate 26 where said blanks can be advanced together with an associated slug, and folded into a generally U-shaped configuration around the forward portion of each slug, as both the blank and slug are fed together, in the downstream direction at identical speeds. The apparatus for folding the carton blanks 30, 30 around the slugs need not be described in detail but its function is noted herein primarily for pointing out the importance of the primary object of the present invention, namely to provide a flight bar conveyor system capable of advancing slugs or groups of articles across a deadplate in accurately indexed relationship with respect to one another.

In accordance with the present invention, additional flight bar conveyors are provided in association with the downstream portion of the infeed conveyor belt 20 and in association with the fixed deadplate 26 for accomplishing the above-mentioned object. A flight bar conveyor 32 associated with the downstream portion of the infeed conveyor 20 will be referred to herein as a retainer flight bar conveyor. Its bars 34, 34 operate at approximately the speed of the infeed conveyor, that is the main flight bar conveyor 24 and the retainer flight bar conveyor 32 have a speed relationship in the ratio of approximately 2½ to 1. With further reference to the main, and the retainer flight bar conveyors 24 and 32 respectively, it will be seen from FIG. 1 that the flight bars thereon, 28 and 34 respectively, are so arranged with respect to one another that both move downwardly toward the same point over the conveyor 20 and at substantially the same time to facilitate the entry of said flight bars between successive groups of articles for example A and C, on the infeed conveyor 20. In position A (FIG. 1) the slug or groups of cans is being advanced from left to right on the infeed conveyor belt whereas in position C (FIG. 1) the slug is about to be engaged by a flight bar 28 on the main flight bar conveyor 24, which bar 28 moves at a speed greater than the speed of the infeed conveyor 20 and greater than that of the retainer flight bar 34. In position D (FIG. 3) the main flight bar 28 can be seen to be accelerating the slug away from the retainer flight bar 34. In position E (FIG. 4) this retainer flight bar 34 has traveled only a fraction of the distance traveled by the corresponding main flight bar 28 and thereby serves to retain the next succeeding slug in the event that the grouper 22 has not provided sufficient spacing, or in the event that the infeed conveyor belt speed continues to operate after the flight bar conveyor system has been shut down. A preceding retainer flight bar 34 can be seen from position E of the slug to move upwardly away from the downstream end of the infeed conveyor 20 and to be replaced by a flight bar 36 associated with a third flight bar conveyor 38.

The third flight bar conveyor 38 is located over the deadplate 26 and its flight bars 36, 36 move at the same speed as the main flight bars 28, 28 associated with the main flight bar conveyor 24. From position F (FIG. 2) it can be seen that the flight bars 36, 36 on the third flight bar conveyor are so arranged with respect to the flight bars 28, 28 on the main flight bar conveyor 24 that said flight bar 36 engages the foremost articles in each group being advanced across the deadplate 26 to prevent distortion of the pattern of grouped articles, especially when the carton blank 30 is being folded into the above-mentioned U-shaped configuration as depicted in positions I, J and K in FIGS. 4, 2 and 1 respectively.

I claim:

1. A conveyor system for feeding orderly groups of articles into a packing machine in accurately indexed relationship, said system comprising a deadplate across which the article groups are to be fed, an infeed conveyor for bringing successive article groups to be indexed onto an upstream end of the deadplate, a main flight bar conveyor located in part over a downstream portion of said infeed conveyor and in part over said deadplate, main flight bars for engaging the rearmost articles in each group and successively accelerating said article groups with respect to said infeed conveyor, a retainer flight bar conveyor located over said downstream portion of said infeed conveyor, and retainer flight bars moving at substantially the same speed as said infeed conveyor to assure that said groups are separated on said deadplate by at least a predetermined distance.

2. A conveyor system as set forth in claim 1 further characterized by a third flight bar conveyor located over said deadplate, flight bars associated with said third flight bar conveyor and moving at the same speed as said main flight bars for engaging the foremost articles in each group being advanced across said deadplate to prevent distortion of the pattern of grouped articles on said deadplate.

3. A conveyor system as set forth in claim 2 wherein said main flight bars and said retainer flight bars both move downwardly toward the same point over said infeed conveyor at substantially the same time to facilitate the entry of said flight bars between successive groups of articles on said infeed conveyor.

4. A conveyor system as set forth in claim 3 wherein said retainer flight bar moves upwardly away from the downstream end of said infeed conveyor at the same time that the foremost articles in the most recently accelerated group reach said downstream end of said infeed conveyor.

5. A conveyor system as set forth in claim 4 wherein one of said third flight bars moves downwardly toward the upstream end of said deadplate at the same time that said retainer flight bar moves upwardly away from said downstream end of said infeed conveyor.

References Cited

UNITED STATES PATENTS

| | | | |
|---|---|---|---|
| 2,805,755 | 9/1957 | Jones | 198—34 |
| 3,335,841 | 8/1967 | Klingel et al. | 198—34 |

ROBERT G. SHERIDAN, Primary Examiner

U.S. Cl. X.R.

198—164